US010580259B2

(12) United States Patent
Czubak et al.

(10) Patent No.: US 10,580,259 B2
(45) Date of Patent: Mar. 3, 2020

(54) SYSTEMS, METHODS AND GAMING MACHINES HAVING LOGIC BASED ON SPORTING EVENTS

(71) Applicant: Novomatic AG, Gumpoldskirchen (AT)

(72) Inventors: Roman Czubak, Traiskircuen (AT); Johann F. Graf, Gumpoldskirchen (AT)

(73) Assignee: Novomatic AG, Gumpoldskirchen (AT)

( * ) Notice: Subject to any disclaimer, the term of this patent is extended or adjusted under 35 U.S.C. 154(b) by 134 days.

(21) Appl. No.: 15/840,963

(22) Filed: Dec. 13, 2017

(65) Prior Publication Data

US 2019/0180570 A1 Jun. 13, 2019

(51) Int. Cl.
*G06F 17/00* (2019.01)
*G07F 17/32* (2006.01)

(52) U.S. Cl.
CPC ...... *G07F 17/3288* (2013.01); *G07F 17/3244* (2013.01)

(58) Field of Classification Search
None
See application file for complete search history.

(56) References Cited

U.S. PATENT DOCUMENTS

| | | | |
|---|---|---|---|
| 7,206,762 | B2 | 4/2007 | Sireau |
| 7,351,149 | B1 | 4/2008 | Simon |
| 7,454,380 | B2 | 11/2008 | Garahi et al. |
| 7,458,891 | B2 | 12/2008 | Asher et al. |
| 7,645,191 | B1 | 1/2010 | McKeever |
| 7,803,046 | B2 | 9/2010 | Scott et al. |
| 7,942,735 | B2 | 5/2011 | Meyer et al. |
| 8,118,675 | B2 | 2/2012 | Lee |
| 8,241,114 | B2 | 8/2012 | Fontaine et al. |
| 8,337,294 | B2 | 12/2012 | Sharkov et al. |
| 8,342,946 | B2 | 1/2013 | Storm et al. |
| 8,419,544 | B2 | 4/2013 | McNutt et al. |

(Continued)

FOREIGN PATENT DOCUMENTS

| | | |
|---|---|---|
| GB | 2484594 | 4/2012 |
| WO | 2007118300 | 10/2007 |

(Continued)

OTHER PUBLICATIONS

Moya, Fabian Enrique, "Statistical methodology for profitable sports gambling." (2012).

(Continued)

*Primary Examiner* — Paul A D'Agostino
(74) *Attorney, Agent, or Firm* — Snell & Wilmer L.L.P.

(57) ABSTRACT

A gaming system may include a gaming machine having a monetary input device, a wager input device, and a processor. The processor may establish a credit balance based on the monetary value, decrease the credit balance by the selected wager, and present the wagering game at an interface. A game server may transmit content for the wagering game to the gaming machine. The game server may determine prize payouts during game play by detecting sporting event outcomes occurring during live sporting games. Each detected sporting event outcome may correspond to a previously determined prize value. The prize values may be determined based on a data analysis of the probable occurrence of each sporting event outcome in previously completed sporting events.

9 Claims, 7 Drawing Sheets

(56) References Cited

U.S. PATENT DOCUMENTS

| | | | |
|---|---|---|---|
| 8,500,530 B2 | 8/2013 | Herbert | |
| 8,545,311 B2 | 10/2013 | Shore et al. | |
| 8,747,216 B2 | 6/2014 | Stearns et al. | |
| 8,858,326 B2 | 10/2014 | Amaitis et al. | |
| 9,053,608 B2 | 6/2015 | Brooks et al. | |
| 9,076,305 B2 * | 7/2015 | Amaitis | G06Q 50/34 |
| 9,208,647 B2 * | 12/2015 | Ulrich | G07F 17/3244 |
| 9,218,721 B2 | 12/2015 | Herbet | |
| 9,355,102 B2 | 5/2016 | Thukral et al. | |
| 2001/0034268 A1 | 10/2001 | Thomas et al. | |
| 2004/0229671 A1 | 11/2004 | Stronach | |
| 2005/0208995 A1 | 9/2005 | Marshall et al. | |
| 2006/0183547 A1 | 8/2006 | McMonigle et al. | |
| 2006/0252520 A1 | 11/2006 | Platis | |
| 2006/0287094 A1 | 12/2006 | Mahaffey et al. | |
| 2007/0060322 A1 | 3/2007 | Benrus | |
| 2007/0087804 A1 | 4/2007 | Knowles et al. | |
| 2008/0139264 A1 | 6/2008 | He et al. | |
| 2009/0181761 A1 | 7/2009 | Yoshizawa | |
| 2009/0305765 A1 * | 12/2009 | Walker | G07F 17/3223 463/20 |
| 2010/0041453 A1 | 2/2010 | Grimm | |
| 2011/0281620 A1 | 11/2011 | Hays | |
| 2013/0211561 A1 | 8/2013 | Scott | |
| 2014/0024435 A1 | 1/2014 | Scott | |
| 2015/0221177 A1 * | 8/2015 | Glancy | G07F 17/3288 463/25 |
| 2015/0279164 A1 | 10/2015 | Miller et al. | |
| 2015/0379816 A1 * | 12/2015 | Hayon | G07F 17/32 463/25 |
| 2016/0098900 A1 | 4/2016 | Benrus | |
| 2017/0092076 A1 | 3/2017 | Anderson et al. | |
| 2017/0103615 A1 | 4/2017 | Thedosopoulos | |
| 2017/0148276 A1 | 5/2017 | Russell et al. | |

FOREIGN PATENT DOCUMENTS

| | | |
|---|---|---|
| WO | 2014121208 | 7/2014 |
| WO | 2016110797 | 7/2016 |

OTHER PUBLICATIONS bet365; "Bet Slip"; http://media.148apps.com/screenshots/514916543/us-ipad-5-football-coupon-betting-live-scores-odds-comparison-bet-tracking-football-betting-app-football-results-epl-premiership-football-stats-wc2014-bets-football-tips-live-football-brazil-2014.jpeg (2017).
bet365; "Sports"; https://www.bet365.com/en/ (2017).
Cashpoint; "Betting Made Easy"; https://cashpoint-solutions.com/pdf/CASHPOINT_Franchise_EN.pdf (2017).
Circus; "Virtual Sports; Bet Every 3 Minutes and Watch the Events Live!"; https://www.circus.be/en/help/virtual-sports (2017).
Dusane Infotech India Pvt. Ltd.; "Terminal Based Online Sports Betting Software"; http://www.dusaneinfotech.com/blog/terminal-based-online-sports-betting-software/ (2017).
SBR; "WagerWeb Sportsbook updates live betting platform"; https://www.sportsbookreview.com/sports-betting-news/wagerweb-sportsbook-updates-live-betting-plafform-71454/ (2017).
SportingBet; https://www.sportingbet.com/ (2017).
Mohawk Online Ltd.; Sports InterAction; https://www.sportsinteraction.com/sportsbook/live-betting/#/overview (2017).
International Search Report and Written Opinion dated Apr. 24, 2018 in Application No. PCT/IB2017/001608.

* cited by examiner

| SPORTING EVENT OUTCOME | PROBABLE OCCURRENCE | PAYOUT SYMBOLS | PRIZE VALUE |
|---|---|---|---|
| 2 BALLS INTO ONE POCKET | 4% | 777 | 10 CREDITS |
| 8-BALL INTO A POCKET DURING BREAK | 5% | BAR BAR BAR | 7 CREDITS |
| 2-BALL IS FIRST INTO ANY POCKET | 6% | 2-BAR 2-BAR 2-BAR | 2 CREDITS |
| ANY BALL INTO A POCKET DURING BREAK | 15% | 3-BAR | 1 CREDIT |

FIG. 7A

| SPORTING EVENT OUTCOME | PROBABLE OCCURRENCE | PAYOUT SYMBOLS | PRIZE VALUE |
|---|---|---|---|
| GOAL SCORED WITHIN FIRST 5 MINUTES | 5% | PEACH PEACH PEACH | 10 CREDITS |
| YELLOW CARD | 7% | APPLE APPLE APPLE | 8 CREDITS |
| GOAL SCORED FROM PENALTY KICK | 13% | KIWI KIWI KIWI | 6 CREDITS |
| GOALKEEPER SAVE | 16% | PINEAPPLE | 4 CREDITS |

FIG. 7B

SYSTEMS, METHODS AND GAMING MACHINES HAVING LOGIC BASED ON SPORTING EVENTS

FIELD

The present disclosure relates generally to gaming machines and systems, and more particularly, to gaming machines and systems found in casinos or betting environments.

BACKGROUND

Gaming machines, otherwise known as slot machines, poker machines, video lottery terminals, or gaming consoles, have proven very popular within the gaming environment to become one of the base elements of the gaming industry. Players, however, quickly become tired of various adaptations of gaming machines, demanding new and inventive ways to represent or play games on such gaming machines. For this reason, game creators must continually invent new and innovative ways to represent games, game play, and award types to stimulate players to encourage further interest.

SUMMARY

A gaming system including a gaming machine is provided. The gaming system may implement logic based on an analysis of outcomes occurring during live events, such as, for example, sporting events. For example, and in accordance with various embodiments, the gaming system may analyze previously completed sporting events, define various outcomes (e.g., sporting event outcomes) occurring during the previously completed events, determine a probable occurrence of each defined outcome during the previously completed events, and assign prize values to each defined outcome (e.g., based on the probable occurrence). As a further example, and in accordance with various embodiments, the gaming system may determine winning gaming events and prize payouts based on monitoring live events (e.g., live sporting events). The gaming system may monitor one or more live events to detect a previously defined outcome (e.g., sporting event outcome) occurring during the live event, retrieve a prize value associated with that previously defined outcome, and transmit prize payouts based on the prize value.

In various embodiments, the gaming system may comprise a processor in electronic communication with the gaming machine and a tangible, non-transitory memory configured to communicate with the processor. The tangible, non-transitory memory may comprise instructions stored thereon that, in response to execution by the processor, cause the processor to perform operations comprising: receiving an input signal comprising a wagering value; monitoring live sporting events or other live events for a predetermined time; detecting one of a plurality of sporting event outcomes occurring during the live sporting events; and retrieving a prize value corresponding to the detected sporting event outcome.

In various embodiments, the operations may further comprise: retrieving, by the processor, pay table symbols corresponding to the detected sporting event outcome; and displaying, by the processor, the pay table symbols on an interface of the gaming machine. The operations may further comprise calculating, by the processor, a prize payout based on the wagering value and the prize value. The operations may further comprise detecting, by the processor, a second sporting event outcome occurring during the live sporting events, wherein the second sporting event outcome corresponds to a second prize value. The operations may further comprise comparing, by the processor, a first detection time of the sporting event outcome and a second detection time of the second sporting event outcome, wherein the prize value or the second prize value is retrieved based on whether the first detection time or the second detection time occurred first. The operations may further comprise comparing, by the processor, the prize value to the second prize value to determine the higher value, in response to the first detection time being equal to the second detection time; and retrieving, by the processor, the prize value or the second prize value based on the comparison.

In various embodiments, a method for calculating a prize value based on a sporting event outcome is disclosed. The method may include the steps of: defining, by a processor, a plurality of sporting event outcomes occurring during a sporting event; analyzing, by the processor, previously completed sporting events based on the sporting event outcome; determining, by the processor, a probable occurrence of each of the plurality of sporting event outcomes based on the analysis of previously completed sporting events; and calculating, by the processor, a prize value for each of the plurality of sporting event outcomes, wherein the price value is based on the probable occurrence.

In various embodiments, the prize value may be further based on a game payout. The method may also comprise assigning, by the processor, a pay table symbol to the each of the plurality of sporting event outcomes. The method may also comprise storing, by the processor, at least one of the sporting event outcome, the probable occurrence, the pay table symbol, or the prize value on a gaming machine.

In various embodiments, the sporting events may include at least one of American football, archery, badminton, baseball, basketball, bowling, boxing, cricket, cue sports, darts, fishing, golf, handball, hockey, ice-based sports, jai alai, lacrosse, mixed martial arts, polo, racing, rugby, soccer, softball, table tennis, tennis, water-based sports, wrestling, or volleyball.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

FIG. 7A illustrates exemplary sporting event outcomes for a billiards sporting event, according to various embodiments.

FIG. 7B illustrates exemplary sporting event outcomes for a soccer sporting event, according to various embodiments.

DETAILED DESCRIPTION

Figure 1:
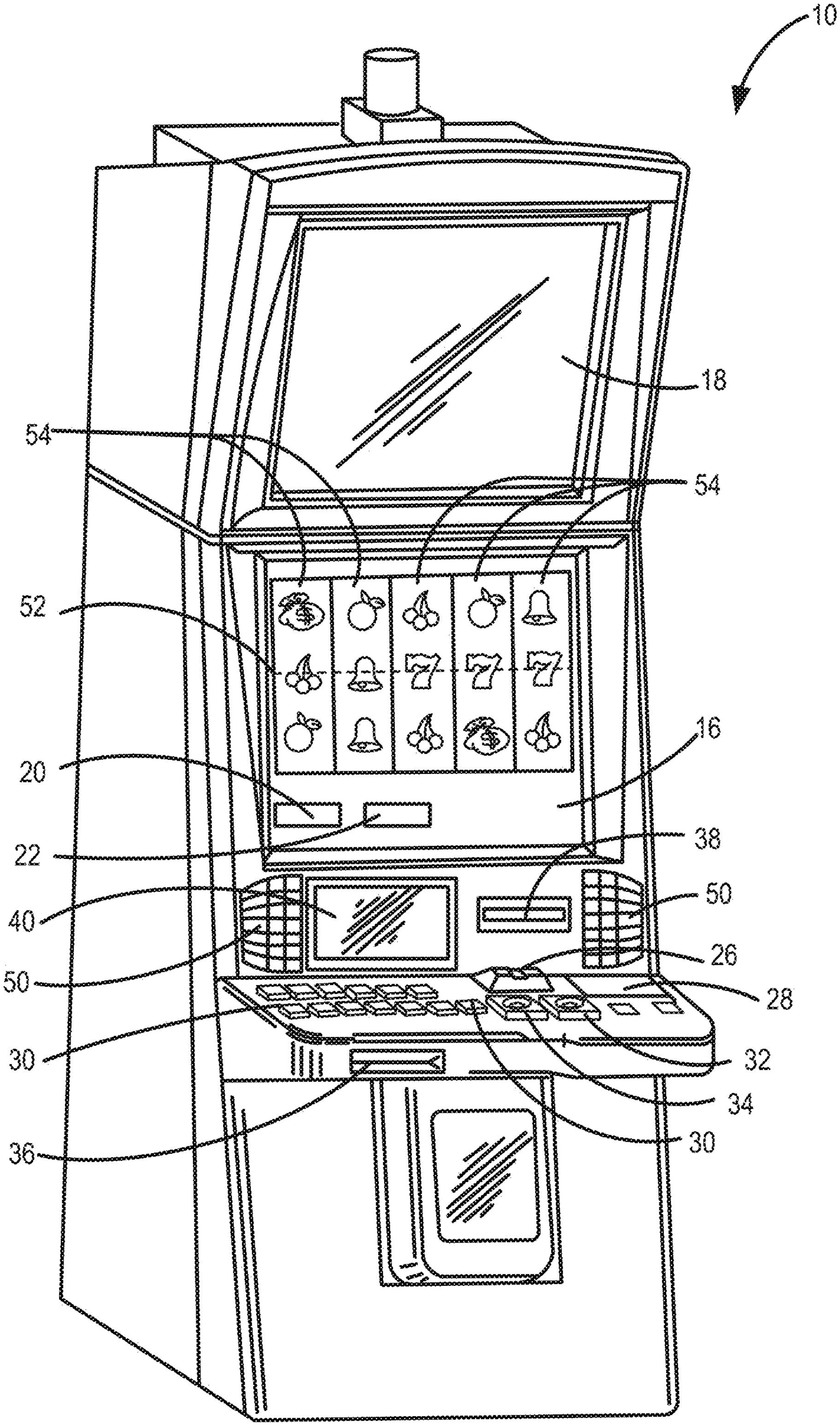
FIG. 1 is a perspective view of a gaming machine which allows for playing of a casino game with multiple reels, according to various embodiments.

Reference throughout this specification to "one embodiment", "an embodiment", "one example" or "an example" means that a particular feature, structure or characteristic described in connection with the embodiment or example is included in at least one embodiment of the present disclosure and may be variously included on many embodiments. Thus, appearances of the phrases "In various embodiments", "in an embodiment," "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Several (or different) elements discussed below, and/or claimed, are described as being "coupled," "in communication with," or "configured to be in communication with." This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis.

The methodologies described herein may be implemented by various means depending upon applications according to particular examples. For example, such methodologies may be implemented in hardware, firmware, software, or combinations thereof. In a hardware implementation, for example, the controller or processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be appreciated, however, that all of these or similar terms are to be associated with appropriate physical quantities and are merely convenient labels.

Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this description, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

For clarity in discussing the various functions of the system, multiple computers and/or servers are discussed as performing different functions. These different computers (or servers) may, however, be implemented in multiple different ways such as modules within a single computer, as nodes of a computer system, etc. The functions performed by the system (or nodes or modules) may be centralized or distributed in any suitable manner across the system and its components, regardless of the location of specific hardware. Furthermore, specific components of the system may be referenced using functional terminology in their names. The function terminology is used solely for purposes of naming convention and to distinguish one element from another in the following discussion. Unless otherwise specified, the name of an element conveys no specific functionality to the element or component. It should be appreciated that, in selected embodiments, the software, hardware, and associated components of the system may be programmed and configured to implement one or more embodiments described herein. It should also be appreciated that the various aspects of the system may be exemplified as software, modules, nodes, etc., of a computer or server.

Embodiments of the present invention may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In various embodiments, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and/or memory devices. In such a "thick client" embodiment, the gaming device local processor executes the communicated computerized instructions to control any games (or other suitable interfaces) provided to a player.

Referring to FIG. 1, one embodiment of a gaming machine or device 10, according to the present disclosure, has a support structure, housing, or cabinet which provides support for a plurality of displays, inputs, controls, and other features of a conventional gaming machine. The gaming machine 10 can be positioned on a base or stand or can be configured as a pub-style table-top game (not shown) which a player can operate preferably while sitting. It should be appreciated that the gaming machine 10 may have varying cabinet and display configurations. Moreover, while a conventional-like gaming machine 10 may be used, as disclosed herein, the gaming system may be implemented on any system, machine, device, or the like providing support for a plurality of displays, inputs, controls, and other features.

Figure 2:
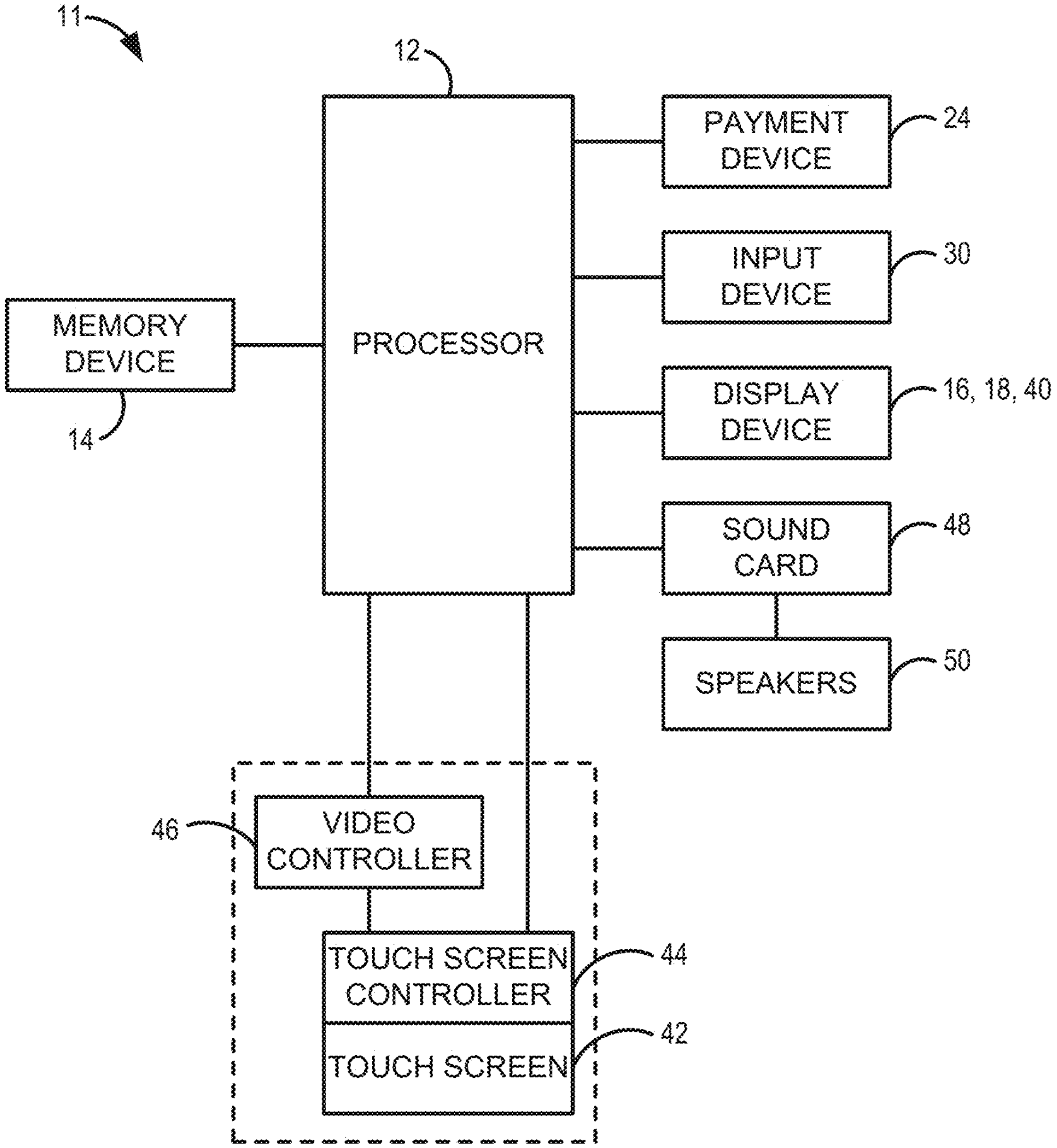
FIG. 2 is a diagrammatic view of an electronic system which allows for playing of a casino game with multiple reels, according to various embodiments.

In various embodiments, as illustrated in FIG. 2, an electronic system 11 for playing the casino game, according to the present disclosure, is shown. The electronic system 11 may be a separate gaming system or may be part of the gaming machine 10 of FIG. 1. The electronic system 11 includes at least one processor 12, such as a microprocessor, a microcontroller-based platform, a suitable integrated circuit or one or more application-specific integrated circuits (ASIC's). The processor 12 is in communication with or operable to access or to exchange signals with at least one data storage or memory device 14. In various embodiments, the processor 12 and the memory device 14 reside within the cabinet of the gaming machine 10. The memory device 14 stores program code and instructions, executable by the processor 12, to control the gaming machine 10. The memory device 14 also stores other data such as image data, event data, player input data, random or pseudo-random number generators, pay-table data or information, and applicable game rules that relate to the play of the casino game. In various embodiments, the memory device 14 includes random access memory (RAM), which can include non-volatile RAM (NVRAM), magnetic RAM (MRAM), ferroelectric RAM (FeRAM), and other forms as commonly understood in the gaming industry. In various embodiments, the memory device 14 includes read only memory (ROM). In various embodiments, the memory device 14 includes flash memory and/or electrically erasable programmable read only memory (EEPROM). It should be appreciated that, any other suitable magnetic, optical, and/or semiconductor memory may operate in conjunction with the electronic system 11.

In various embodiments, part or all of the program code and/or operating data described above can be stored in a detachable or removable memory device 14, including, but not limited to, a suitable cartridge, disk, CD-ROM, DVD, BLU-RAY disk, or USB memory device. In other embodiments, part or all of the program code and/or operating data described above can be downloaded to the memory device 14 through a suitable network.

In various embodiments, an operator or a player can use a removable memory device in a desktop computer, a laptop computer, a hand-held device, such as a personal digital assistant (PDA), a portable computing or mobile device, or another computerized platform to implement present disclosure. In various embodiments, the electronic system 11 is operable over a wireless network, for example as part of a wireless gaming system. In such embodiments, the electronic system 11 may be a hand-held device, a mobile device, or any other suitable wireless device that enables a player to play any suitable game at a variety of different locations. In various embodiments in which the electronic system 11 is a hand-held device, a mobile device, or any other suitable wireless device, at least one memory device and at least one processor which control the game or other operations of the hand-held device, mobile device, or other suitable wireless device may be located: (a) at the hand-held device, mobile device or other suitable wireless device; (b) at a central server or central controller; or (c) any suitable combination of the central server or central controller and the hand-held device, mobile device or other suitable wireless device. It should be appreciated that a gaming device or gaming machine as disclosed herein may be a device that has obtained approval from a regulatory gaming commission or a device that has not obtained approval from a regulatory gaming commission. It should be appreciated that the processor 12 and memory device 14 may be collectively referred to herein as a "computer" or "controller."

In various embodiments, gaming machine 10 generates awards, prizes, and/or other game outcomes based on sporting event outcomes or other live event outcomes, as discussed further herein. In one embodiment, awards, prizes, or other game outcomes are associated with a sporting event outcome having a determined probable occurrence, and gaming machine 10 generates the award, prize, or other game outcome to be provided to the player based on the occurrence of the sporting event outcome. In one embodiment, awards, prizes, or other game outcomes are associated with a live event outcome having a determined probable occurrence, such as, for example, sporting events, cooking competitions, talent shows (e.g., The X Factor®, American Idol®, etc.), poker tournaments, and/or other events that reoccur and comprise common rules, and gaming machine 10 generates the award, prize, or other game outcome to be provided to the player based on the occurrence of the live event outcome. Since gaming machine 10 generates awards, prizes, and/or other game outcomes based on sporting event outcomes, there is no certainty that gaming machine 10 will ever provide the player with any specific award, prize, or other game outcome.

In various embodiment, as illustrated in FIGS. 1 and 2, the electronic system 11 includes one or more display devices 16, 18, 40 controlled by the processor 12. Display devices 16, 18, 40 are preferably connected to or mounted on the cabinet of the gaming machine 10. The embodiment shown in FIG. 1 includes a central display device 16 which displays a primary or base game and an upper display device 18. This display device 16 may also display any suitable secondary game associated with the primary or base game as well as information relating to the primary or secondary game. The upper display device 18 may display the primary game, any suitable secondary game associated or not associated with the primary game and/or information relating to the primary or secondary game. These display devices 16, 18, 40 may also serve as digital glass operable to advertise games or other aspects of the gaming establishment. As depicted in FIG. 1, in accordance with various embodiments, the gaming machine 10 includes a credit display 20 which displays a player's current number of credits, cash, account balance, or the equivalent. In various embodiments, the gaming machine 10 includes a bet display 22 which displays a player's amount wagered. In various embodiments, the gaming machine 10 includes a player tracking display 40 which displays information regarding a player's play tracking status. It should be appreciated that these devices are in communication with the processor 12.

In another embodiment, at least one display device may be a mobile display device, such as a PDA or tablet PC, that enables play of at least a portion of the primary or secondary game at a location remote from the gaming machine 10 or electronic system 11.

Display devices 16, 18, 40 may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In various embodiments, as described in more detail below, the display device includes a touch-screen with an associated touch-screen controller. The display devices may be of any suitable size and configuration, such as a square, a rectangle or an elongated rectangle.

Display devices 16, 18, 40 of the gaming machine 10 are configured to display at least one and preferably a plurality of games or other suitable images, symbols and indicia such as any visual representation or exhibition of the movement of objects such as mechanical, virtual, or video reels and wheels, etc., and the like.

In various embodiments, the symbols, images and indicia displayed on or of the display device may be in mechanical form. That is, the display device may include any electro-mechanical device, such as one or more mechanical objects, such as one or more rotatable wheels or reels configured to display at least one or a plurality of games or other suitable images, symbols or indicia. In various embodiments, the mechanical objects may also be electronically controlled by processor 12, via an actuator or other similar device.

As illustrated in FIG. 2, in various embodiments, the electronic system 11 includes at least one payment device 24 in communication with the processor 12. The payment device 24 may accept a physical item associated with a monetary value and may establish or increase a credit balance for the player based on the monetary value. The payment device 24 may be a payment acceptor including a note, ticket or bill acceptor 28 (e.g., as depicted in FIG. 1) wherein the player inserts paper money, a ticket, or voucher in a coin slot 26 (e.g., as depicted in FIG. 1) where the player inserts money, coins, or tokens. In other embodiments, payment devices 24 such as readers or validators for credit cards, debit cards or credit slips may accept payment.

In various embodiments, a player may insert an identification card into a card reader of the gaming machine 10. In various embodiments, the identification card is a smart card having a programmed microchip, a coded magnetic strip or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the gaming machine 10. In various embodiments, money may be transferred to a gaming machine 10 through electronic funds transfer. It should be appreciated that, when a player funds the gaming machine 10, the processor 12 determines the amount of funds entered and displays the corresponding amount on the credit or other suitable display as described previously.

As depicted in FIGS. 1 and 2, in various embodiments, the gaming machine 10 and electronic system 11 include at least one and preferably a plurality of input devices 30 in communication with the processor 12. Input devices 30 can include any suitable device which enables the player to produce an input signal which is received by the processor 12. In various embodiments, after appropriate funding of the gaming machine 10, input device 30 is a game activation device, such as a play button 32 or a pull arm (not shown) which is used by the player to start any primary or base game or sequence of events in the gaming machine 10. The play button can be any suitable play activator such as a bet one button, a max bet button, or a repeat the bet button. In various embodiments, upon appropriate funding, the gaming machine 10 begins the game play automatically. In another embodiment, upon the player engaging one of the input devices 30, the gaming machine 10 automatically activates game play.

In various embodiments, one input device 30 is a wager input device, such as a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device 30 is a bet max button or one or more intermediate bet buttons (not shown) which enable the player to bet the maximum wager or one or more intermediate wagers, respectively, that are permitted or accepted for a game of the gaming machine 10.

In various embodiments, one input device 30 is a cash out button 34. The player may push the cash out button and initiate a "cash out" operation to receive a cash payment or other suitable form of payment corresponding to the number of remaining credits. In various embodiments, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. In various embodiments, the gaming machine 10 includes at least one card reader 38 in communication with the processor 12. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. It should be appreciated that any suitable payout mechanism, such as funding to the player's electronically recordable identification card or smart card, may be implemented in accordance with the gaming machine 10.

In various embodiments, as mentioned above and as depicted in FIG. 2, one input device 30 is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming machine 10 or the electronic system 11 by touching the touch-screen at the appropriate locations. One such input device 30 is a conventional touch-screen button panel.

The electronic system 11 may further include a plurality of communication ports for enabling communication of the processor with external peripherals, such as external video sources, expansion buses, game or other displays, a SCSI port, or a keypad.

In various embodiments, as seen in FIG. 2, the electronic system 11 includes a sound generating device controlled by one or more sounds cards 48 which function in conjunction with the processor 12. In various embodiments, the sound generating device includes at least one and preferably a plurality of speakers 50 or other sound generating hardware and/or software for generating sounds, such as by playing music for the primary and/or secondary game or by playing music for other modes of the gaming machine 10, such as an attract mode. In various embodiments, the gaming machine 10 provides dynamic sounds coupled with attractive multimedia images displayed on one or more of the display devices to provide an audio-visual representation or to otherwise display full-motion video with sound to attract players to the gaming machine 10. During idle periods, the gaming machine 10 may display a sequence of audio and/or visual attraction messages to attract potential players to the gaming device. The videos may also be customized to provide any appropriate information.

In one embodiment, the gaming machine 10 may also display a sequence of audio and/or visuals "mirroring" or representing an example of the live sporting event or other live event being monitored. For example, and as discussed further herein, in response to the gaming machine 10 detecting a home run event outcome occurring while monitoring a live baseball game, the gaming machine 10 may display a visual representation of a player hitting a home run. The depiction may comprise a stylized visual or may comprise a real-life visual of the sporting event outcome.

The gaming machine 10 can incorporate any suitable wagering game as the primary or base game. The gaming machine 10 may include some or all of the features of conventional gaming machines or devices. In various embodiments, the primary or base game may be any suitable reel-type game susceptible to representation in an electronic or electromechanical form, which, in accordance with various embodiments, produces an outcome based on the occurrence of a sporting event outcome within a predetermined time after placement of a wager, as discussed further herein.

In various embodiments, as illustrated in FIG. 1, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof, as previously discussed herein. In various embodiments, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In various embodiments, the gaming machine 10 awards prizes after the reels of the primary or base game stop spinning if specified types and/or configurations of indicia or symbols occur on an active payline or otherwise occur in a winning pattern, occur on the requisite number of adjacent reels and/or occur in a scatter pay arrangement.

In various embodiments, in addition to winning credits or other awards in a base or primary game, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. It should be appreciated that, in various embodiments, the bonus or secondary game is similar to the base or primary game.

Figure 3:
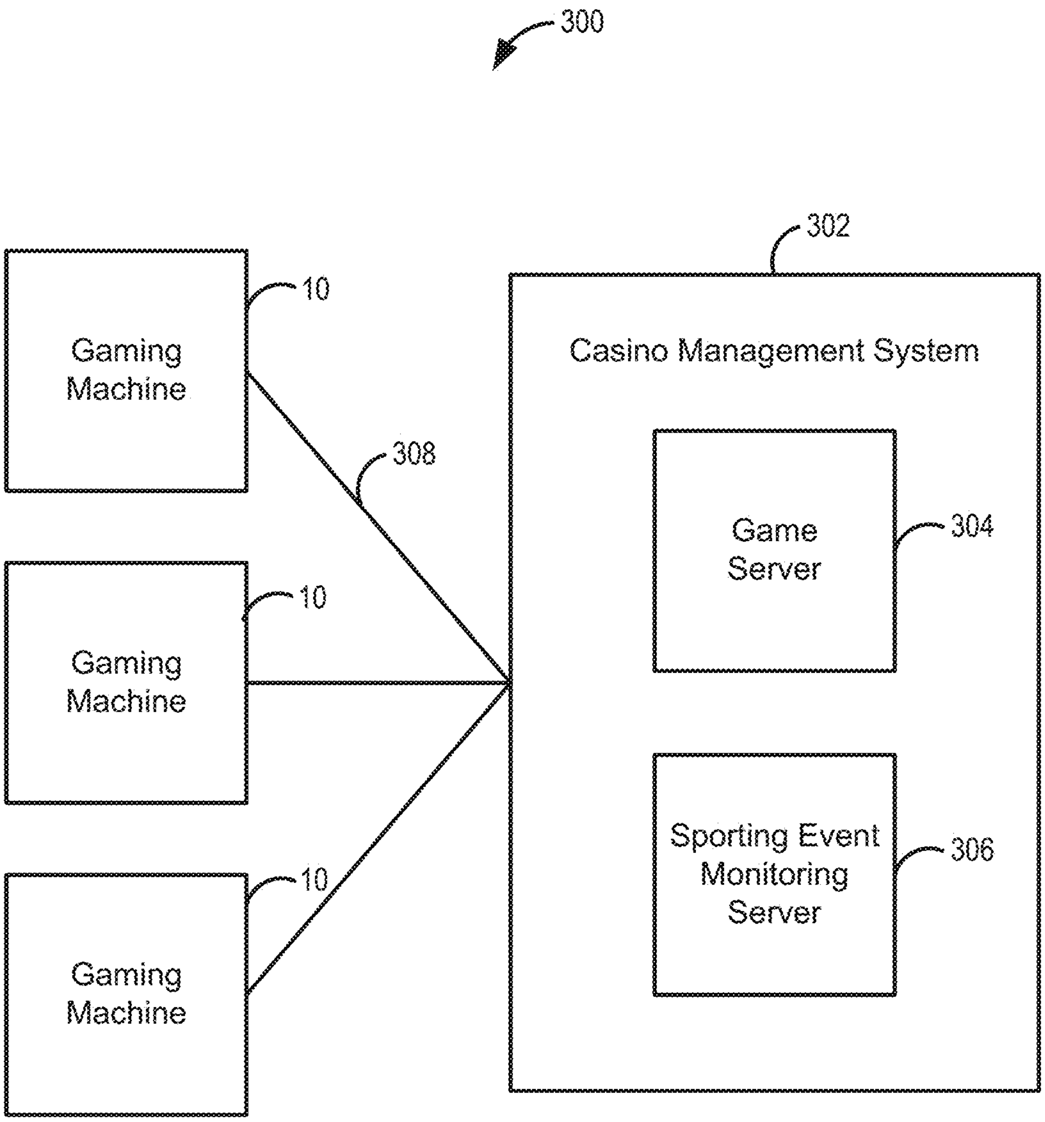
FIG. 3 is a block diagram of a gaming system which allows for playing of a casino game with multiple reels, according to various embodiments.

FIG. 3 is a block diagram illustrating a gaming system 300 for playing the casino game, according to various embodiments. The gaming system 300 includes a casino management system 302 that is coupled to one or more gaming machines 10. Casino management system 302 includes a game server 304 and a sporting event monitoring server 306 in communication with each other. In various embodiments, each server 304, 306 may also be in communication with gaming machines 10.

In this embodiment, game server 304 and sporting event monitoring server 306 include at least one processor and at least one memory or storage device. In an alternative embodiment, game server 304 and/or sporting event monitoring server 306 may be implemented as a progressive controller or a processor of one of the gaming machines 10 in the gaming system.

In the embodiments described herein, the processor of each gaming machine 10 is designed to transmit and receive events, messages, commands, or any other suitable data or signal between the individual gaming machine 10 and casino management system 302 (e.g., game server 304 and/or sporting event monitoring server 306). The gaming machine processor is operable to execute such communicated events, messages, or commands in conjunction with the operation of the gaming machine 10. Moreover, the processors of game server 304 and sporting event monitoring server 306 are designed to transmit and receive events, messages, commands, or any other suitable data or signal between the central server and each of the individual gaming machines 10.

In various embodiments, a plurality of the gaming machines 10 are coupled together through a data network 308. In various embodiments, the data network 308 is a local area network (LAN), in which one or more of the gaming machines 10 are substantially proximate to each other within a gaming establishment or a portion of a gaming establishment. In another embodiment, the data network is a wide area network (WAN) in which one or more of the gaming machines 10 are in communication with at least one off-site casino management system.

In another embodiment, the data network is the Internet. In this embodiment, the operation of the gaming machine 10 can be viewed with an internet browser operating on a user device or another suitable computer. In this embodiment, operation of the gaming machine 10 and accumulation of credits may be accomplished with only a connection to the casino management system 302 through a conventional phone or other data transmission line, cell phone tower, digital subscriber line (DSL), T-1 line, coaxial cable, fiber optic cable, or other suitable connection. In this embodiment, players may access an internet game page from any location where an internet connection and computer or other internet facilitator is available.

In an exemplary embodiment, the present disclosure may be employed in a server-based gaming system. In one such embodiment, as described above, one or more gaming machines 10 are in communication with game server 304 and/or sporting event monitoring server 306. In various embodiments, a memory device of game server 304 stores different game programs and instructions, executable by a gaming machine processor, to control the gaming machine 10. Each executable game program represents a different game or type of game which may be played on one or more of the gaming machines 10 in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming machine) or vice versa.

In operation, the processor of the game server 304 is operable to communicate one or more of the stored game programs to at least one gaming machine processor. In alternative embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the game server 304, the gaming machine processor executes the communicated program to facilitate play of the communicated program by a player through the display device(s) and/or input device(s) of the gaming machine. That is, when a game program is communicated to a processor of a gaming machine, the gaming machine processor changes the game or type of game played at the gaming machine.

In various embodiments, sporting event monitoring server 306 is operable to determine and define a plurality of sporting event outcomes occurring during one or more sporting events. Sporting event monitoring server 306 may determine a probable occurrence of each sporting event outcome based on an analysis of previously completed sporting events. The sporting event outcomes may be assigned prize values and pay table symbols based on a calculated probable occurrence (e.g., as disclosed with reference to FIGS. 7A and 7B). Sporting event monitoring server 306 is also operable to monitor live sporting events and detect the occurrence of a live sporting event outcome. For example, sporting event monitoring server 306 may monitor live sporting events in response to a player playing a gaming machine 10. Detecting the occurrence of a live sporting event outcome may cause the player to win, with the prize payout being based on the prize value previously calculated. The operation of sporting event monitoring server 306 is described more fully below with respect to FIG. 4, for example.

Figure 4:
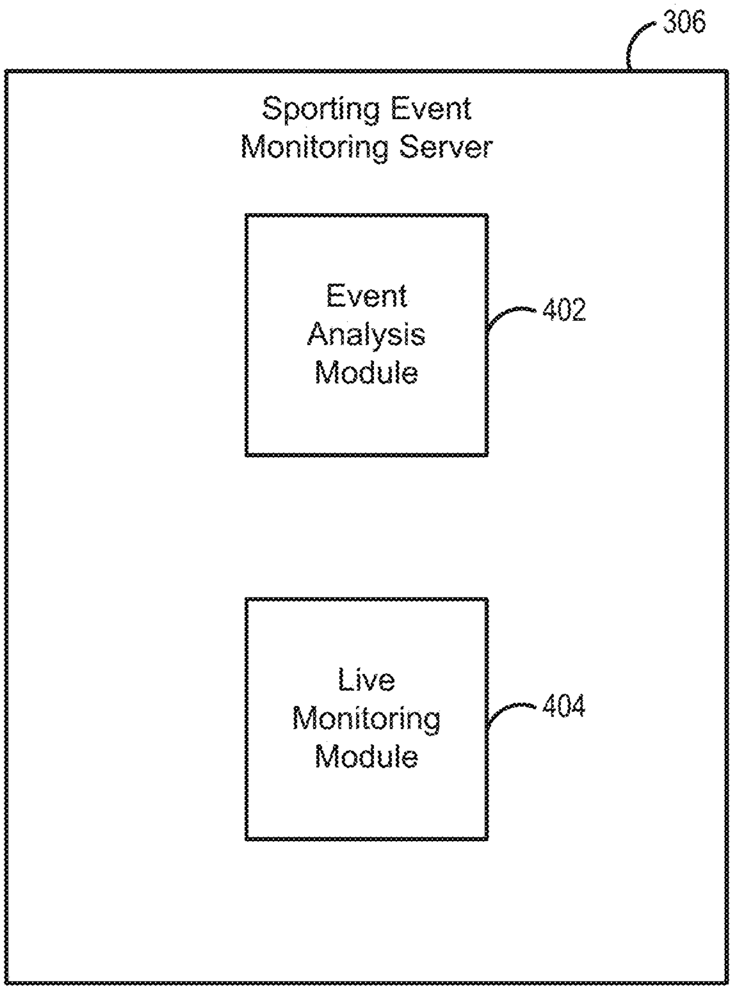
FIG. 4 is a block diagram of an exemplary sporting event monitoring server that may be used with a gaming system, according to various embodiments.

FIG. 4 is a block diagram of an exemplary sporting event monitoring server 306 that may be used with system 300 (shown in FIG. 3). In various embodiments, sporting event monitoring server 306 includes a plurality of software modules that are stored in a computer-readable medium as a plurality of computer-executable instructions. Alternatively or additionally, the modules may be implemented in hardware (such as one or more circuits) and/or firmware. In various embodiments, the modules include an event analysis module 402 and a live monitoring module 404.

Figure 5:
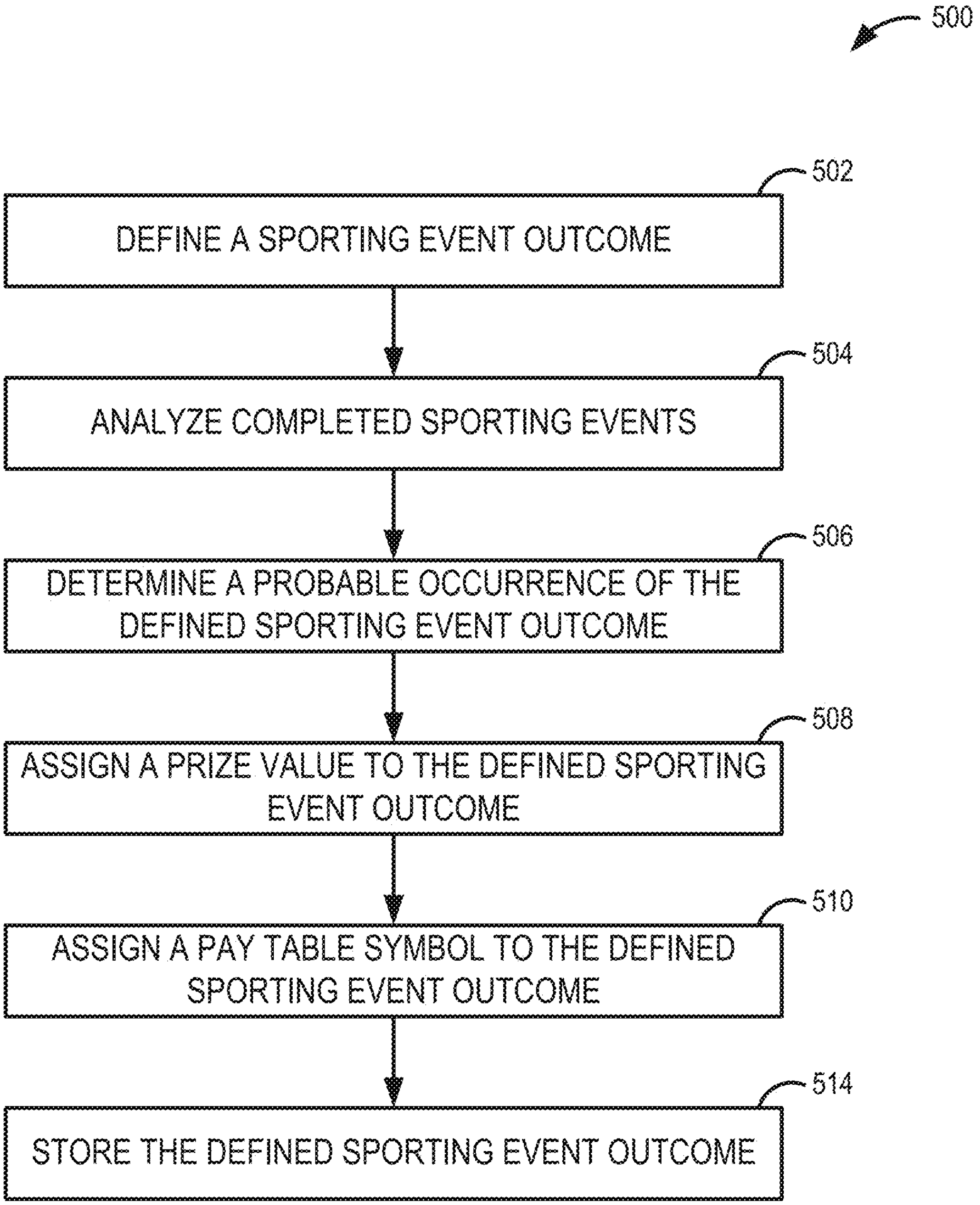
FIG. 5 is a flow diagram of an exemplary method of calculating a prize value based on a sporting event outcome, according to various embodiments.

In various embodiments, event analysis module 402 may be operable to calculate a prize value based on a sporting event outcome. Event analysis module 402 may define a plurality of sporting event outcomes occurring during a sporting event. In one embodiment, event analysis module 402 may analyze previously completed sporting events to identify and determine the plurality of sporting event outcomes. In another embodiment, event analysis module 402 may receive a user input comprise predefined sporting event outcomes. Event analysis module 402 may comprise internal memory configured to store the defined sporting event outcomes. The sporting events and sporting event outcomes are described in further detail in the below discussion of method 500 (FIG. 5).

Event analysis module 402 may also analyze previously completed sporting events to determine the probable occurrence of each sporting event outcome occurring during a sporting event. For example, event analysis module 402 may generate a data set comprising any suitable number (e.g., 10, 100, 1,000, 100,000, etc.) of completed sporting events corresponding to a single defined sporting event (e.g., 1,000 football games). Event analysis module 402 may analyze the dataset of completed sporting events to determine the probable occurrence of a particular sporting event outcome occurring during the sporting event.

Event analysis module 402 may also be configured to assign a prize value to each defined sporting event outcome. The prize value may be assigned based on the calculated probable occurrence. For example, sporting event outcomes having a greater probable occurrence may be assigned a lower prize value compared to a sporting event outcome having a low probable occurrence. The calculating of prize values is described in further detail in the below discussion of method 500 (FIG. 5).

Event analysis module 402 may also be configured to assign and/or store pay table symbols for each defined sporting event outcome. The pay table symbols may be randomly assigned to each defined sporting event outcome, or may be manually assigned or assigned through any other suitable means.

Event analysis module 402 may comprise memory and may store the defined sporting event outcome, the probable occurrence, the prize value, and the assigned pay table symbols therein. For example, and with brief reference to FIGS. 7A and 7B, the defined sporting event outcomes for each sporting event may be grouped and sorted to include at least the sporting event outcome, the probable occurrence, the pay table symbols, and the prize value. The sporting event outcome data may be stored using any suitable data storage technique. Each sporting event outcome data may also be grouped or assigned a key value to correlate the data with each respective sporting event outcome. In one embodiment, the defined sporting event outcome data may also be transmitted by event analysis module 402 to each gaming machine 10, and stored individually in memory in each gaming machine 10.

In various embodiments, live monitoring module 404 may be operable to monitoring live sporting events while a player is playing a gaming machine 10, detect live sporting event outcomes, and calculate a prize payout based on the detected live sporting event outcome.

Live monitoring module 404 may be configured to monitor live sporting events for a predetermined time after a player activates a game and places a wager. For example, in response to receiving the input signal to play the game, live monitoring module 404 may be configured to monitor live sporting events for 5 seconds, 10 second, 30 seconds, and/or any other suitable or desired predetermined time. In one embodiment, live monitoring module 404 may be configured to monitor live sporting events for one specified sporting event (e.g., only soccer matches). In other embodiments, live monitoring module 404 may be configured to monitor live sporting events across a plurality of predetermined sporting events (e.g., basketball, soccer, baseball, etc., or any subset thereof). Live monitoring module 404 may monitor one or more of the live sporting events to detect a sporting event outcome.

Live monitoring module 404 may monitor the live sporting events in real time through the use of machine learning, artificial intelligence, sports analytical modeling, or the like. In this embodiment, live monitoring module 404 may actively monitor one or more live sporting events, and may identify and detect sporting event outcomes through the use of machine learning, artificial intelligence, sports analytical modeling, or the like.

In one embodiment, live monitoring module 404 may also be configured to monitor third-party systems to detect sporting event outcomes. For example, live monitoring module 404 may monitor TWITTER®, or other similar social networks, to intelligently detect an increase in posts, tweets, or the like concerning a defined sporting event outcome. Live monitoring module 404 may also monitor one or more mobile applications for sporting events, such as the ESPN® App, CBS Sports® Mobile, or the like, to intelligently detect a defined sporting event outcome.

In various embodiments, the live sporting events may also be monitored by a third-party, and detected sporting event outcomes may be transmitted to live monitoring module 404. For example, sporting scouts, news media, or the like often attend sporting events and transmit and update stats, scores, and similar sporting event outcomes in real time. In one embodiment, spectators at sporting events may be provided access to a smartphone app, and individual spectators may report the occurrence of sporting event outcomes. Live monitoring module 404 may be configured to receive such data (e.g., as a presorted series of detected sporting event outcomes, as raw data, etc.) to detect the occurrence of a sporting event outcome.

In various embodiments, sporting event outcomes may also be detected through live video monitoring implementing artificial intelligence support. For example, and in accordance with one embodiment, a computer-based system implementing artificial intelligence capabilities may be configured to monitor a live video feed. In another embodiment, the computer-based system may include cameras placed to monitor a live sporting event, and the artificial intelligence system may be instructed to automatically detect sporting event outcomes and report the detected sporting event outcomes to live monitoring module 404.

In various embodiments, multiple sporting event outcomes may be detected by live monitoring module 404. In response to detecting multiple sporting event outcomes within the predetermined time, live monitoring module 404 may select one of the detected sporting event outcomes using any suitable technique or logic. For example, in one embodiment, live monitoring module 404 may select the sporting event outcome that was first detected. In another embodiment, or wherein multiple sporting event outcomes occurred simultaneously, live monitoring module 404 may retrieve data corresponding to each sporting event outcome. For example, live monitoring module 404 may compare the prize values associated with each sporting event outcome to determine the sporting event outcome having the greater prize value. Live monitoring module 404 may be configured to select the sporting event outcome having the greater prize value.

In response to detecting or selecting a sporting event outcome, live monitoring module 404 may retrieve the pay table symbols and prize payout corresponding to the detected sporting event outcome. Live monitoring module 404 may display the pay table symbols on the gaming machine 10. Live monitoring module 404 may calculate a prize payout based on the prize value and the wagered value. For example, wherein the prize value is 10 credits and the wagering value was 1 credit, the prize payout is 10 credits. As a further example, wherein the prize value is 10 credits and the wagering value was 10 credits, the prize payout is 100 credits. Live monitoring module 404 may transmit the prize payout to the gaming machine 10.

While the embodiments described herein may be implemented using a sporting event monitoring server 306 of a casino management system 302, it should be recognized that the embodiments may alternatively be implemented on each gaming machine 10 by the controller or processor of that gaming machine 10.

In various embodiments, and with reference to FIG. 5, a flow diagram of an exemplary method 500 for calculating a prize value based on a sporting event outcome is disclosed. Method 500 may be used with system 300 (shown in FIG. 3). In an exemplary embodiment, method 500 is implemented by sporting event monitoring server 306. Accordingly, each step of method 500 may be implemented as one or more computer-executable instructions and/or modules that are executed by a processor of sporting event monitoring server 306 to perform the functions described herein.

Figure 6:
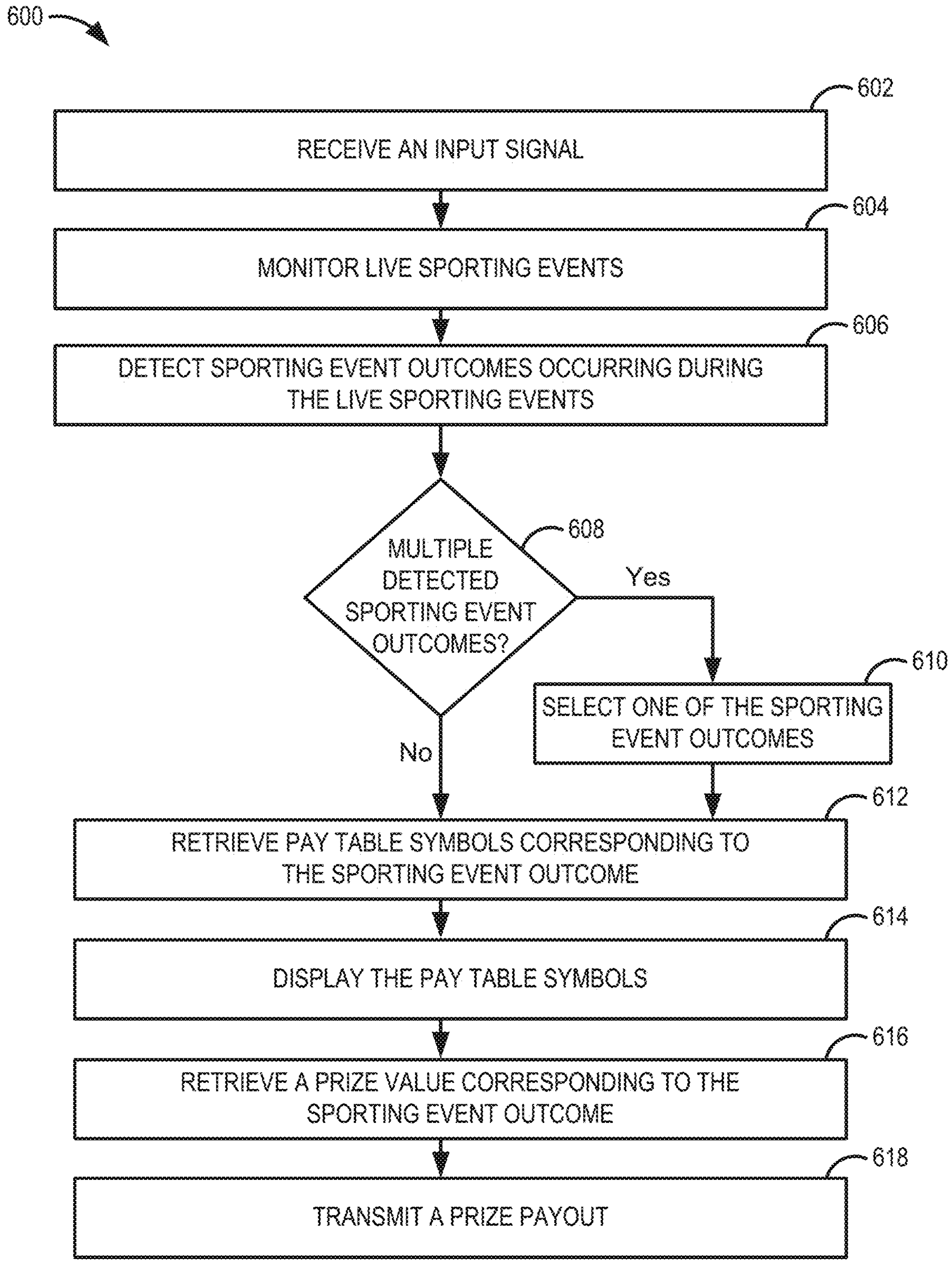
FIG. 6 illustrates a flow diagram of an exemplary method of determining a prize payout based on live sporting events, according to various embodiments.

In various embodiments, method 500 may include defining a sporting event outcome (step 502). In one embodiment, one or more sporting event outcomes may be defined based on a user input. Any suitable number of sporting event outcomes may be defined. For example, thousands of sporting event outcomes may be defined such that live sporting event outcomes are detectable at all hours of the day, as discussed further with reference to method 600 (FIG. 6). In another embodiment, one or more sporting event outcomes may be defined by event analysis module 402 based on an analysis of sporting events, as discussed further herein. The sporting event outcomes may be stored in memory in sporting event monitoring server 306, such as, for example, in memory in event analysis module 402.

In various embodiments, a sporting event outcome may comprise any identifiable and definable outcome occurring during a sporting event. The sporting event may comprise any suitable organized sport or other live event having measurable and identifiable outcomes occurring therein. For example, the sporting event may be American football, archery, badminton, baseball, basketball, bowling, boxing, cricket, cue sports (e.g., billiards, pool, snooker, etc.), darts, fishing, golf, handball, hockey, ice-based sports (e.g., ice hockey, broomball, figure skating, curling, speed skating, etc.), jai alai, lacrosse, mixed martial arts, polo, racing, rugby, soccer, softball, table tennis, tennis, triathlons, water-based sports (e.g., swimming, diving, boating, water polo, etc.), wrestling, volleyball, and/or any other suitable sporting event.

Each sporting event may comprise an organized sport or other live event at various levels of professionalism. For example, in American football, the sporting event may comprise a National Collegiate Athletic Association ("NCAA") football game, a National Football League ("NFL") football game, an Arena Football League ("AFL") football game, a Canadian Football League ("CFL") football game, or the like. As a further example, in soccer, the sporting event may comprise a Major League Soccer ("MLS") match, a Federation Internationale de Football Association ("FIFA") World Cup match, a Union of European Football Associations ("UEFA") Champions League match, or the like.

The sporting event outcome may comprise any identifiable and definable outcome or event occurring during a sporting event. For example, in a billiard game a sporting event outcome may comprise the 8-ball going into a specified pocket during the break (e.g., pocket 1, pocket 2, etc.), no ball going into a pocket during the break, a specified ball going first into any pocket (e.g., 1-ball is first into a pocket, 11-ball is first into a pocket, etc.), a specified ball going into a defined pocket (e.g., 2-ball goes into pocket 1, 5-ball goes into pocket 6, etc.), two balls going into the same pocket on the same shot, and/or any other suitable similarly definable outcome.

As a further example, in a soccer match a sporting event outcome may comprise a penalty kick occurring, a goal being scored, a corner kick leading directly to a goal, a goalie save, a yellow card, a red card, a steal, and/or any other suitable similarly definable outcome.

Thus, the sporting event outcome may comprise any outcome or event occurring during the sporting event that is measurable within a fixed timeframe, and may be independent from typical measurable events such as a half-time score, a final score, or the like, although those events too may be includes as outcomes detected.

In various embodiments, method 500 may include analyzing completed sporting events (step 504). In one embodiment, step 502 of defining the sporting event outcome may occur simultaneously, or near simultaneously, with step 504 of analyzing completed sporting events. In that respect, the defined sporting event outcomes may be based at least partially on the analyzed sporting event data. For example, a sporting event outcome may be identified during the sporting event analysis and included as a defined sporting event outcome.

Event analysis module 402 may perform the data analysis on the completed sporting events. For example, event analysis module 402 may generate a data set comprising any suitable number (e.g., 10, 100, 1,000, 100,000, etc.) of completed sporting events corresponding to a single defined sporting event (e.g., 1,000 football games). Event analysis module 402 may analyze the data set to determine the frequency and occurrence of defined sporting event outcomes occurring across all of the completed sporting events in the dataset. For example, method 500 may include determining a probable occurrence of the defined sporting event outcome (step 506). In that respect, event analysis module 402 may analyze the dataset of completed sporting events to determine the probable occurrence of a particular sporting event outcome occurring during the sporting event.

For example, in calculating the probable occurrence of various sporting event outcomes in a billiards sporting event, it may be determined that the 8-ball goes into a pocket during break 5% of the time (e.g., this sporting event outcome occurs on average 5% of the time in the dataset), any ball goes into a pocket during break 15% of the time, the 2-ball goes into a pocket first 6% of the time, two balls go into a single pocket during one shot 5% of the time when there are 12 balls on the table, two balls go into a single pocket during one shot 2% of the time when there are 5 balls on the table, etc.

As a further example, in calculating the probable occurrence of various sporting event outcomes in a soccer sporting event, it may be determined that a penalty kick occurs within five minutes after the start of the game 5% of the time (e.g., this sporting event outcome occurs on average 5% of the time in the dataset), a steal occurs at any given point in the game 10% of the time, a corner kick leading directly to a goal occurs 7% of the time, etc.

In one embodiment, a user may also independently calculate the probable occurrence of one or more sporting event outcomes, and may input and store the probable occurrence in memory in sporting event monitoring server 306.

In various embodiments, method 500 may include assigning a prize value to the defined sporting event outcome (step 508). Event analysis module 402 may assign the prize value to each defined sporting event outcome. In one embodiment, the prize value may be assigned based on the calculated probable occurrence and a defined game cycle. For example, a game cycle may be defined as 10,000,000 games, and with one credit being bet per a game, the game cycle may have a total credit fund of 10,000,000 credits. A game payout may be defined as 96% (e.g., 96% of the prize fund is paid out, and 4% of the prize fund is profit), meaning that a prize fund may comprise 9,600,000 credits (e.g., 96% of the total credit fund of 10,000,000 credits).

For example, and for ease of explanation, in a billiards sporting event, four sporting event outcomes may be defined as paying events: the 8-ball going into a pocket during break, having a 5% probable occurrence; any ball going into a pocket during break, having a 15% occurrence; the 2-ball going into a pocket first, having a 6% probable occurrence; and two balls going into a single pocket during one shot, having a 4% probable occurrence (wherein each probable occurrence may be calculated as a result of a big data analysis of past data available for that particular sporting event where those particular sporting event outcomes occurred, as previously discussed).

Based on the prize fund and the probable occurrence of each sporting event outcome defined as a paying event, the prize value for each sporting event outcome may be calculated as follows. For example, the percent of the probable occurrence of each sporting event outcome may be taken from the prize fund and prize values may be assigned to each paying event such that the total prize payouts is equal to or near equal to the prize fund. As an example, the two balls going into a single pocket during one shot sporting event outcome (4% probable occurrence) may be assigned a prize value of 10 credits per an occurrence such that the total prize is 3,760,000 credits (i.e., 4% of 9,400,00 is 376,000, and 376,000 multiplied by 10 is 3,760,000); the 8-ball going into a pocket during break sporting event outcome (5% probable occurrence) may be assigned a prize value of 7 credits per an occurrence such that the total prize is 3,290,000 (i.e., 5% of 9,400,000 is 470,000, and 470,000 multiplied by 7 is 3,290,000); the 2-ball going into a pocket first sporting event outcome (6% probable occurrence) may be assigned a prize value of 2 credits per an occurrence such that the total prize is 1,128,000 credits (i.e., 6% of 9,400,000 is 564,000, and 564,000 multiplied by 2 is 1,128,000); and the any ball going into a pocket during break sporting event outcome (15% probable occurrence) may be assigned a prize value of 1 credit such that the total prize is 1,410,000 (i.e., 15% of 9,400,000 is 1,410,000, and 1,410,000 multiplied by 1 is 1,410,000). In that respect, the total prize value of all the paying events is 9,588,000 (e.g., the sum of all total prizes), such that the game machine pays out 95.88%.

In various embodiments, method 500 may include assigning a pay table symbol to the defined sporting event outcome (step 510). The pay table symbols may be randomly assigned to each defined sporting event outcome, or may be manually assigned or assigned through any other suitable means. In one embodiment, the number of reel strips in the gaming machine may comprise as many pay table symbols as necessary to achieve the calculated prize payouts. For example, the assigned pay table symbols may comprise a plurality of indicia or symbols, such as bells, hearts, fruits, numbers, letters, bars, or other images which preferably correspond to a theme associated with the gaming machine. As an example, the two balls going into a single pocket during one shot sporting event outcome may be assigned the "777" pay table symbol, the 8-ball going into a pocket during break sporting event outcome may be assigned the "BAR BAR BAR" pay table symbol, the 2-ball going into a pocket first sporting event outcome may be assigned the "2-BAR 2-BAR 2-BAR" pay table symbol, and/or the any ball going into a pocket during break sporting event outcome may be assigned the "3-BAR" pay table symbol.

In various embodiments, method 500 may include storing the defined sporting event outcome (step 512). For example, and with reference to FIGS. 7A and 7B, the defined sporting event outcomes for each sporting event may be grouped and sorted to include at least the sporting event outcome, the probable occurrence, the pay table symbols, and the prize value. The sporting event outcome data may be stored using any suitable technique. Each sporting event outcome data may also be grouped or assigned a key value to correlate the data with each respective sporting event outcome. The defined sporting event outcome data may be stored in memory in sporting event monitoring server 306, such as, for example, in memory in event analysis module 402. In one embodiment, the defined sporting event outcome data may also be stored in memory in each gaming machine.

In various embodiments, and with reference to FIG. 6, a flow diagram of an exemplary method 600 for determining a prize payout based on live sporting events is disclosed. Method 600 may be used with system 300 (shown in FIG. 3). In an exemplary embodiment, method 600 is implemented by sporting event monitoring server 306. Accordingly, each step of method 600 may be implemented as one or more computer-executable instructions and/or modules that are executed by a processor of sporting event monitoring server 306 to perform the functions described herein.

In various embodiments, method 600 may include receiving an input signal (step 602). The input signal may be received by the gaming machine, and may comprise a wagering amount (e.g., 1 credit, 5 credits, etc.) and may be configured to activate the game.

In various embodiments, method 600 may include monitoring live sporting events (step 604). The live sporting events may be monitored to detect sporting event outcomes occurring during one or more of the live sporting events (step 606). Live monitoring module 404 may be configured to monitor live sporting events for a predetermined time. For example, in response to receiving the input signal to play the game, live monitoring module 404 may be configured to monitor live sporting events for 5 seconds, 10 second, 30 seconds, and/or any other suitable or desired predetermined time. In one embodiment, live monitoring module 404 may be configured to monitor live sporting events for one specified sporting event (e.g., only soccer matches). In other embodiments, live monitoring module 404 may be configured to monitor live sporting events across all defined sporting events (e.g., basketball, soccer, baseball, etc.).

In various embodiments, any suitable number of live sporting events may be monitored simultaneously. In other embodiment, a minimum number of live sporting events must be monitored simultaneously. For example, the minimum number could be based on the data analysis of previously completed sporting events and calculated probable occurrences. As an example, wherein the sporting event is soccer, and a sporting event outcome of a penalty occurring during the first 5 minutes of a game has a calculated probable occurrence of five percent (5%), the minimum number of live sporting events required to be monitored at a given time may be 20 games to ensure that the sporting event outcome will occur in at least one game. In other embodiments, the minimum number of require live sporting events may be manually input, or may be based on any other suitable factors.

In one embodiment, during the predetermined time the live sporting events are being monitored, the reels may spin and/or visuals may be displayed on the gaming machine to indicate that the gaming machine is responding to the input.

In various embodiments, the live sporting events may be monitored in real time through the use of machine learning, artificial intelligence, sports analytical modeling, or the like. In this embodiment, live monitoring module 404 may actively monitor one or more live sporting events, and may identify and detect sporting event outcomes through the use of machine learning, artificial intelligence, sports analytical modeling, or the like. In one embodiment, live monitoring module 404 may also be configured to monitor third-party systems to detect sporting event outcomes. For example, live monitoring module 404 may monitor TWITTER®, or other similar social networks, to intelligently detect an increase in posts, tweets, or the like concerning a defined sporting event outcome. Live monitoring module 404 may also monitor one or more mobile applications for sporting events, such as the ESPN® App, CBS Sports® Mobile, or the like, to intelligently detect a defined sporting event outcome. In various embodiments, live sporting events may be monitored in real time, or based on any suitable delay (e.g., 5 minutes, 10 minutes, etc.). In this embodiment, additional care and fraud detection may be needed to ensure that no misuse or fraud is occurring.

In various embodiments, the live sporting events may also be monitored by a third-party, and detected sporting event outcomes may be transmitted to live monitoring module 404. For example, sporting scouts, news media, or the like often attend sporting events and transmit and update stats, scores, and similar sporting event outcomes in real time. Live monitoring module 404 may be configured to receive such data (e.g., as a presorted series of detected sporting event outcomes, as raw data, etc.) to detect the occurrence of a sporting event outcome.

In various embodiments, multiple sporting event outcomes may be detected (step 608). For example, when monitoring a basketball game a sporting event outcome of a steal may be quickly followed by a sporting event outcome of a made basket, within the same predetermined time. As a further example, in response to monitoring a plurality of sporting events, sporting event outcomes across sporting events or across games within one sporting event may occur and be detected within the same predetermined time. Each of the detected sporting event outcomes may correspond to different prize values.

In response to detecting multiple sporting event outcomes within the predetermined time, method 600 may include selecting one of the sporting event outcomes (step 610). Live monitoring module 404 may select one of the detected sporting event outcomes using any suitable technique or logic. For example, in one embodiment, live monitoring module 404 may select the sporting event outcome that was first detected. In another embodiment, or wherein multiple sporting event outcomes occurred simultaneously, live monitoring module 404 may retrieve data corresponding to each sporting event outcome. For example, live monitoring module 404 may compare the prize values associated with each sporting event outcome to determine the sporting event outcome having the greater prize value. Live monitoring module 404 may be configured to select the sporting event outcome having the greater prize value.

In various embodiments, method 600 may include retrieving the pay table symbols corresponding to the sporting event outcome (step 612). Sporting event monitoring server 306 may retrieve the corresponding pay table symbols from memory. With brief reference to FIGS. 7A and 7B, the pay table symbols may be stored to correspond to each sporting event outcome such that sporting event monitoring server 306 may query the memory based on the detected sporting event outcome to determine the pay table symbols to display. In various embodiments, method 600 may include displaying the pay table symbols (step 614). The pay table symbols may be displayed on gaming machine 10.

In various embodiments, method 600 may include retrieving a prize value corresponding to the sporting event outcome (step 616). Sporting event monitoring server 306 may retrieve the corresponding prize value from memory. With brief reference to FIGS. 7A and 7B, the prize values may be stored to correspond to each sporting event outcome such that sporting event monitoring server 306 may query the memory based on the detected sporting event outcome to determine the prize value.

In various embodiments, method 600 may include transmitting a prize payout (step 618). The prize payout may comprise the prize value as modified by the wager value. For example, wherein the prize value is 10 credits and the wagering value was 1 credit, the prize payout is 10 credits. As a further example, wherein the prize value is 10 credits and the wagering value was 10 credits, the prize payout is 100 credits.

In various embodiments, step 614, 616, and 618 may occur simultaneously or near simultaneously with step 616 such that the pay table symbols and the prize value are displayed simultaneously or near simultaneously on gaming machine 10.

In various embodiments, in response to detecting the sporting event outcome the gaming machine 10 may display or otherwise indicate that the player has won. In one embodiment, gaming machine 10 may dispense coins or tokens into the coin payout tray amounting to the prize payout.

In various embodiments, the number of credits shown in the credit display preferably increases by the prize payout. The player may then push the cash out button and initiate a "cash out" operation to receive a cash payment or other suitable form of payment corresponding to the number of remaining credits, as previously described. For example, the player receives the ticket or credit slip and may redeem the value associated with the ticket or credit slip via a cashier (or other suitable redemption system), the player receives coins or tokens amounting to the prize payout in the coin payout tray, or the player receives a credit to the player's electronically recordable identification card or smart card.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Those skilled in the art will readily appreciate that the systems and methods described herein may be a standalone system or incorporated in an existing gaming system. The system of the invention may include various computer and network related software and hardware, such as programs, operating systems, memory storage devices, data input/output devices, data processors, servers with links to data communication systems, wireless or otherwise, and data transceiving terminals. It should also be understood that any method steps discussed herein, such as for example, steps involving the receiving or displaying of data, may further include or involve the transmission, receipt and processing of data through conventional hardware and/or software technology to effectuate the steps as described herein. Those skilled in the art will further appreciate that the precise types of software and hardware used are not vital to the full implementation of the methods of the invention so long as players and operators thereof are provided with useful access thereto, either through a mobile device, gaming platform, or other computing platform via a local network or global telecommunication network.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A gaming system, comprising:

a gaming machine;

a processor in electronic communication with the gaming machine; and a tangible, non-transitory memory configured to communicate with the processor, the tangible, non-transitory memory having instructions stored thereon that, in response to execution by the processor, cause the processor to perform operations comprising:

receiving, by the processor, an input signal comprising a wagering value;

monitoring, by the processor, live sporting events for a predetermined time;

detecting, by the processor, a first sporting event outcome of a plurality of sporting event outcomes occurring during the live sporting events, wherein the first sporting event outcome corresponds to a first prize value;

detecting, by the processor, a second sporting event outcome of the plurality of sporting event outcomes occurring during the live sporting events, wherein the second sporting event outcome corresponds to a second prize value;

comparing, by the processor, a first detection time of the first sporting event outcome and a second detection time of the second sporting event outcome;

retrieving, by the processor, the first prize value or the second prize value based on whether the first detection time or the second detection time occurred first;

comparing, by the processor, the first prize value to the second prize value to determine the higher value, in response to the first detection time being equal to the second detection time; and retrieving, by the processor, the first prize value or the second prize value based on the comparison.

2. The gaming system of claim 1, further comprising:

retrieving, by the processor, pay table symbols corresponding to the detected sporting event outcome; and displaying, by the processor, the pay table symbols on an interface of the gaming machine.

3. The gaming system of claim 1, further comprising calculating, by the processor, a prize payout based on the wagering value and the prize value.

4. The gaming system of claim 1, wherein the live sporting events comprise at least one of American football, archery, badminton, baseball, basketball, bowling, boxing, cricket, cue sports, darts, fishing, golf, handball, hockey, ice-based sports, jai alai, lacrosse, mixed martial arts, polo, racing, rugby, soccer, softball, table tennis, tennis, water-based sports, wrestling, or volleyball.

5. A gaming system, comprising:

a gaming machine;

a processor in electronic communication with the gaming machine; and a tangible, non-transitory memory configured to communicate with the processor, the tangible, non-transitory memory having instructions stored thereon that, in response to execution by the processor, cause the processor to perform operations comprising:

receiving, by the processor, a gaming machine activation event comprising a wagering value;

detecting, by the processor, a first sporting event outcome of a plurality of sporting event outcomes occurring during the live sporting events, wherein the first sporting event outcome corresponds to a first prize value;

detecting, by the processor, a second sporting event outcome of the plurality of sporting event outcomes occurring during the live sporting events, wherein the second sporting event outcome corresponds to a second prize value;

comparing, by the processor, a first detection time of the first sporting event outcome and a second detection time of the second sporting event outcome;

retrieving, by the processor, the first prize value or the second prize value based on whether the first prize value or the second prize value occurred first, wherein the first prize value and the second prize value are each calculated based on a big data analysis of a probable occurrence of the first sporting event outcome, for the first prize value, and the second sporting event outcome, for the second prize value, in previously completed sporting events;

comparing, by the processor, the first prize value to the second prize value to determine the higher value, in response to the first detection time being equal to the second detection time; and retrieving, by the processor, the prize value or the second prize value based on the comparison.

6. The gaming system of claim 5, wherein the sporting event outcome is detected by monitoring the live sporting events for a predetermined time based on the plurality of sporting event outcomes.

7. The gaming system of claim 5, wherein the sporting event outcome is detected by receiving a presorted series of detected sporting event outcomes occurring during the live sporting events.

8. The gaming system of claim 5, further comprising:

retrieving, by the processor, pay table symbols corresponding to the detected sporting event outcome; and displaying, by the processor, the pay table symbols on an interface of the gaming machine.

9. The gaming system of claim 5, further comprising calculating, by the processor, a prize payout based on the wagering value and the prize value.

* * * * *